United States Patent Office 3,524,065
Patented Aug. 11, 1970

3,524,065
SEMICONDUCTOR LIGHT ATTENUATOR AND UTILIZATION DEVICE
Nicholas N. Winogradoff, Rockville, and Herbert K. Kessler, Bethesda, Md., assignors to the United States of America as represented by the Secretary of Commerce
Filed Feb. 1, 1967, Ser. No. 613,976
Int. Cl. G01b 1/02
U.S. Cl. 250—216                                    4 Claims

ABSTRACT OF THE DISCLOSURE

Light falling on an attenuator is reduced in intensity by means of a reradiation process and is then applied to a photo-utilization device. The attenuator comprises semiconductor material doped in a substantially uniform manner with donors or acceptors. The material has a band-gap that is smaller than the photon energy of the light applied thereto and is preferably of an indirect band-gap type.

BACKGROUND OF THE INVENTION

This invention relates to a device for attenuating and then using light, defined as electromagnetic radiation ranging from the ultraviolet through the infrared limits of the spectrum.

Accurately measuring the output energy is one of the major problems in characterizing and standardizing a source of high-intensity light, such as a laser. Photodetectors used in conventional radiometric measurements are generally calibrated against low-intensity black body source; their use at higher intensities by extrapolation may introduce major uncertainties. In addition, laser beams are intense enough to damage the detector.

One approach to the problem has been to attenuate the laser beam by means of calibrated glass filters of suitable thickness and colors. Unfortunately, even a single flash of an intense laser beam may bleach the filter or otherwise alter their transmission characteristics.

Another approach has been to attenuate the beam by means of a block of magnesium carbonate and to observe the diffuse scattering obtained from the block with a small-angle detector. This technique is particularly applicable to unpolarized light and has the disadvantage that the block may undergo chemical decomposition when exposed to the laser beam. Further, the blocks produced for this purpose vary in chemical composition and physical texture, and are not easily reproducible with the same characteristics.

While intense light beams may be measured by calorimetric methods with much less risk of damage to the components used, the technique is an integrating one and has a response time ranging in many seconds. Hence it is not possible to measure such characteristics as the shape of a laser pulse of short duration.

SUMMARY OF THE INVENTION

In accordance with the present invention, an attenuator is provided that comprises semiconductor material that is doped in a substantially uniform manner with donor or acceptors. The material has a band-gap that is smaller than the photon energy of the light applied thereto and is preferably unbiased and of an indirect band-gap type. When a beam of light is directed on the semiconductor material, light is absorbed and subsequently reradiated at a longer wavelength and reduced intensity. A photo-utilization device is positioned to receive the light radiated by the semiconductor material.

In practicing this invention, the source of light may be a ruby laser and the photo-utilization device a calibrated photo-multiplier tube whose output is connected to an oscilloscope. This arrangement can be used to measure a high-intensity pulse of the laser without materially altering the transmission characteristics of the attenuator. Again, the semiconductor material in the attenuator is easily reproducible with the same characteristics at relatively low cost.

DESCRIPTION OF THE PREFERRED EMBODIMENT

Figure 1:
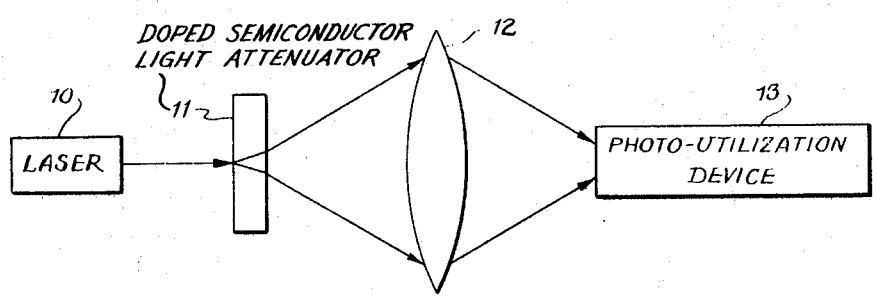
FIG. 1 discloses a preferred embodiment of the present invention.

With reference to FIG. 1, the attenuator comprises a wafer 11 that is formed of semiconductor material doped in a substantially uniform manner with donors or acceptors. The semiconductor material is preferably of the indirect band-gap type, such as silicon, germanium or gallium phosphide. The wafer is preferably highly polished and etched to reduced nonradiative surface recombination effects. The semiconductor material used in any particular application has a band-gap that is smaller than the photon energy in the light applied thereto, and the wafer in a typical application has a thickness of 0.4 to 1.0 millimeter.

The beam of light, generated by ruby laser 10, is allowed to fall on the semiconductor wafer 11 and, except for the light reflected at the surface, is absorbed to produce a large number of free electrons and holes in the material. The electrons move from the lower energy level to an upper energy level. The electrons are now in any excited state; and under the proper conditions recombine with the holes created by the excitation, via the donors or acceptors. A steady state of excited electrons is reached when the rate of excitation is equal to the rate of recombination.

Figure 2:
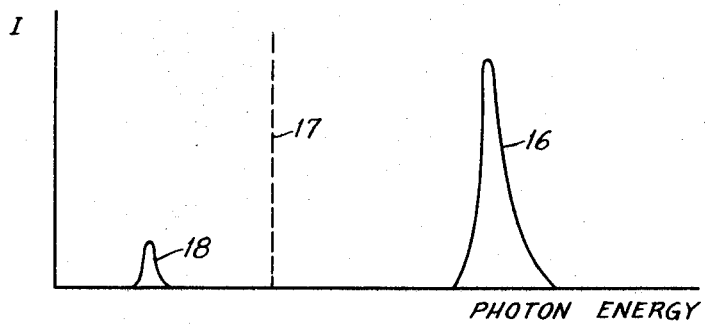
FIG. 2 is a graph of photon energy versus intensity and is used in explaining the operation of the embodiment in FIG. 1.

When an electron drops from the upper to the lower level through a radiative recombination center, radiative recombination occurs and a photon of light is generated by wafer 11. The photon will have an energy level less than that of the band-gap of the semiconductor material in wafer 11 and will be able to penetrate to the rear surface of the material where a fraction, governed by the critical angle, will emerge from the back surface as shown in FIG. 1. This process is very inefficient. For example, with indirect band-gap materials the efficiency for reradiation is attenuated many orders of magnitude at the more conventional light intensities, e.g., as derived from ribbon filament or zirconium arc lamps. Thus, in FIG. 2 waveform 16 represents the incident spectrum on wafer 11, dotted line 17 represents the band-gap of the semiconductor in the wafer, and waveform 18 the output spectrum of the wafer.

The photons emitted from wafer 11 are focused by lens 12 on photo-utilization device 13 and have a wavelength defined by $$\lambda = \frac{1.234}{E_g} \mu m.$$

where $\lambda$ = the wavelength of the emitted light and
$E_g$ = the energy of the band-gap.

This value of $\lambda$ is smaller than that generally observed since it has been shown that the radiative transitions occur through the impurity (donor or acceptor) levels. The radiative recombination lifetimes observed are very short. When, for example, the semiconductor material in wafer 11 is silicon the recombination lifetimes are many orders of magnitude shorter ($<2\times10^{-8}$ seconds) than conventional photoconductive lifetimes ($\sim2\times10^{-4}$ seconds) measured on the same sample. This will permit the wafer to be used with a fast photodetector and oscilloscope at 13 in such a way as to show the individual spikes in the output of ruby laser 10 and to show the shape of a Q switched pulse. The pulse shape of the light emitted by wafer 11 will be a faithful reproduction of the light incident on the wafer.

Additional information on the principles that underlie this invention may be obtained by reference to an article entitled "Radiative Recombination Lifetimes in Laser-Excited Silicon" by N. N. Winogradoff and H. K. Kessler, which was published in Applied Physics Letters, vol. 8, No. 4, Feb. 15, 1966.

It will be apparent that many modifications and variations of this invention are possible. The range of light incident on wafer 11 could, for example, be extended into the infrared by the proper selection of the semiconductor material in wafer 11. Again, if the intensity of the laser beam is comparatively low, the signal applied to photo-utilization device 13 may be enhanced by focusing the laser beam on wafer 11.

We claim:
1. In a light attenuator utilization device,
an attentuator comprising a wafer of semiconductor material doped in a substantially uniform manner with donors or acceptors,
said material having a band-gap that is smaller than the photon energy of the light applied thereto,
said wafer having an incident surface and a back surface,
said incident surface being positioned to receive and absorb light, whereby holes and electrons are formed in the material and then recombine to form photons that are emitted from said back surface, and
photo-utilization device positioned to receive said photons.

2. The device in claim 1 wherein said semiconductor material is unbiased.

3. The device in claim 1 wherein said semiconductor material comprises an indirect band-gap semiconductor material.

4. The device in claim 1 including light focusing means positioned between said semiconductor material and said photo-utilization device.

References Cited

UNITED STATES PATENTS

| 3,070,698 | 12/1962 | Bloembergen. |
| 3,090,020 | 6/1968 | Mandelkorn. |
| 3,397,316 | 8/1968 | Brown et al. ____ 252—301.4 X |

OTHER REFERENCES

C. Hilsum and A. C. Rose-Innes, Semiconducting III–V Compounds, Pergamon, 1961, pp. 192, 226 and 227.

RALPH G. NILSON, Primary Examiner

C. M. LEEDON, Assistant Examiner

U.S. Cl. X.R.
252—621.3, 301.4